United States Patent
Ben Henda et al.

(10) Patent No.: US 11,184,344 B2
(45) Date of Patent: Nov. 23, 2021

(54) AUTHORIZATION OF USER EQUIPMENT FOR MOBILE COMMUNICATIONS NETWORK THAT HAS PREVIOUSLY BEEN AUTHORIZED BY TRUSTED TRAFFIC AUTHORITY

(71) Applicant: Telefonaktiebolaget LM Ericsson (publ), Stockholm (SE)

(72) Inventors: Noamen Ben Henda, Stockholm (SE); Prajwol Kumar Nakarmi, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

(21) Appl. No.: 16/316,785

(22) PCT Filed: Jul. 10, 2017

(86) PCT No.: PCT/EP2017/067294
§ 371 (c)(1),
(2) Date: Jan. 10, 2019

(87) PCT Pub. No.: WO2018/015200
PCT Pub. Date: Jan. 25, 2018

(65) Prior Publication Data
US 2019/0158489 A1    May 23, 2019

Related U.S. Application Data

(60) Provisional application No. 62/363,459, filed on Jul. 18, 2016.

(51) Int. Cl.
*H04L 29/06* (2006.01)
*H04W 4/44* (2018.01)
(Continued)

(52) U.S. Cl.
CPC ...... *H04L 63/0815* (2013.01); *H04L 63/0823* (2013.01); *H04L 63/102* (2013.01);
(Continued)

(58) Field of Classification Search
CPC .......... H04W 4/40–46; H04L 63/0815; H04L 63/0823; H04L 63/102; H04L 9/3263
See application file for complete search history.

(56) References Cited

U.S. PATENT DOCUMENTS

| 8,397,063 B2 | 3/2013 | DiCrescenzo |
| 2009/0150979 A1 | 6/2009 | Fujino |

(Continued)

FOREIGN PATENT DOCUMENTS

| JP | 2009140447 A | 6/2009 |
| JP | 2013513256 A | 4/2013 |

(Continued)

OTHER PUBLICATIONS

Bibmeyer et al., "Preparing Secure Vehicle-to-X Communication Systems", Jan. 2014, 106 pages (Year: 2014).*

(Continued)

*Primary Examiner* — Thaddeus J Plecha
(74) *Attorney, Agent, or Firm* — Coats + Bennett, PLLC (57) ABSTRACT

A method of operation of a control node (400, 700, 1000) in a mobile communications network, the method comprising: receiving a request for authorization from a user equipment (500, 800, 1100); determining whether the request for authorization includes evidence that the user equipment is authorized by a trusted traffic authority; and processing the request for authorization only if the request for authorization includes evidence that the user equipment is authorized by the trusted traffic authority. Methods for the user equipment (Continued)

and a trusted authority device, as well as corresponding devices, computer programs and computer program products are also disclosed.

21 Claims, 6 Drawing Sheets

(51) Int. Cl.
    *H04W 12/069*     (2021.01)
    *H04W 12/082*     (2021.01)
    *H04W 4/40*     (2018.01)

(52) U.S. Cl.
    CPC ............... *H04W 4/40* (2018.02); *H04W 4/44* (2018.02); *H04W 12/069* (2021.01); *H04W 12/082* (2021.01)

(56) References Cited

U.S. PATENT DOCUMENTS

| | | | |
|---|---|---|---|
| 2009/0167535 A1* | 7/2009 | Sanchez | H04L 9/0833 340/573.1 |
| 2009/0235071 A1* | 9/2009 | Bellur | H04W 12/082 713/158 |
| 2010/0070760 A1 | 3/2010 | Vanderveen et al. | |
| 2011/0087882 A1* | 4/2011 | Kuo | H04L 9/006 713/156 |
| 2015/0058929 A1 | 2/2015 | Ayyagari et al. | |
| 2016/0119151 A1 | 4/2016 | Park et al. | |
| 2016/0173489 A1 | 6/2016 | Narayanan | |
| 2016/0269388 A1* | 9/2016 | Ezell | H04M 3/42212 |
| 2017/0250816 A1* | 8/2017 | Popa | G06F 21/12 |
| 2018/0295655 A1* | 10/2018 | Cavalcanti | H04W 76/10 |
| 2018/0324564 A1* | 11/2018 | Feng | H04W 48/08 |
| 2019/0043347 A1* | 2/2019 | Biehle | G08G 1/0141 |

FOREIGN PATENT DOCUMENTS

| | | |
|---|---|---|
| JP | 2015043570 A | 3/2015 |
| KR | 101321080 B1 | 10/2013 |
| KR | 101584001 B1 | 1/2016 |

OTHER PUBLICATIONS

3RD Generation Partnership Project, "3rd Generation Partnership Project; Technical Specification Group Services and System Aspects; Study on Security Aspect for LIE Support of V2X Services (Release 14)", Technical Report, 3GPP TR 33.885 V0.3.0, May 1, 2016, pp. 1-33, 3GPP.

Ericsson, "Solution for Authorization and Accountability in V2X Systems", 3GPP TSG-SA WG3 Meeting #84, Chennai, India, Jul. 25, 2016, pp. 1-3, S3-161132, 3GPP.

3GPP, "3rd Generation Partnership Project; Technical Specification Group Services and System Aspects; Service requirements for V2X services; Stage 1 (Release 14)," Jun. 2016, pp. 1-14, 3GPP TS 22.185 V14.1.0, 3GPP.

3GPP, "3rd Generation Partnership Project; Technical Specification Group Services and System Aspects; Study on architecture enhancements for LTE support of V2X services (Release 14)," Jun. 2016, pp. 1-46, 3GPP TR 23.785 V1.0.0, 3GPP.

Boston University Information Services & Technology, "Understanding Authentication, Authorization, and Encryption," May 23, 2016, pp. 1-3, Boston University Information Services & Technology; retried Aug. 10, 2017 from https://web.archive.org/web/20160526073442/http://www.bu.edu:80/tech/about/security-resources/bestpractice/auth/.

Etsi, Digital cellular telecommunications system (Phase 2+); Universal Mobile Telecommunications System (UTMTS); LTE; Liberty Alliance and 3GPP security interworking; Interworking of Liberty Alliance Identity Federation Framework (ID-FF), Identity Web Services Framework (ID-WSF) and Generic Authentication Architecture (GAA) (3GPP TR 33.980 Version 13.0.0 Release 13), Jan. 2016, pp. 1-42, ETSI TR 133 980 v 13.0.0, ETSI.

3RD Generation Partnership Project, "3rd Generation Partnership Project; Technical Specification Group Services and System Aspects; Study on Architecture Enhancements for LTE Support of V2X Services (Release 14)", Technical Report, 3GPP TR 23.785 V0.4.0, May 1, 2016, pp. 1-45, 3GPP.

\* cited by examiner

AUTHORIZATION OF USER EQUIPMENT FOR MOBILE COMMUNICATIONS NETWORK THAT HAS PREVIOUSLY BEEN AUTHORIZED BY TRUSTED TRAFFIC AUTHORITY

TECHNICAL FIELD

This invention relates to methods, apparatus, computer programs and computer program products for authorizing a user equipment in a mobile communications network.

BACKGROUND

There is a strong drive to more and more utilize the untapped potential of device-to-device communication. One key area in the Internet-of-Things (IoT) is vehicle communication. Standards for Vehicle-to-Everything, V2X, communication and services are currently being developed. GPP TS 22.185 V14.1.0 provides support for V2X service requirements to be supported by Long Term Evolution (LTE) transport.

A service authorization is generally expected to be required for the connection of a vehicle to at least some V2X services. The 3GPP document TS 23.785 V1.0.0 discloses a proposed architectural reference model with a V2X Control Function used for network related actions required for V2X. The V2X Control Function in a home network of a subscriber corresponding to a User Equipment/vehicle has interfaces towards vehicles, V2X application servers, V2X Control Functions in other networks and a Home Subscriber Server (HSS).

SUMMARY

An object of the invention is to enable improvement of at least one of security in, and efficiency of, a communication network in relation to V2X services.

According to a first aspect of the invention there is provided a method of operation of a control node in a mobile communications network. The method comprises: receiving a request for authorization from a user equipment; determining whether the request for authorization includes evidence that the user equipment is authorized by a trusted traffic authority; and processing the request for authorization only if the request for authorization includes evidence that the user equipment is authorized by the trusted traffic authority. Hereby the authorization evidence is shared with an operator of the mobile communication network, which operator would not normally have access to that information due to privacy considerations. Furthermore, it is achieved that authorization from a trusted traffic authority can be considered by the control node/the mobile communications network when deciding about the access/authorization to use a V2X service. This also means that unauthorized use of V2X services by UEs that are not authorized by the trusted traffic authority can at least be reduced, which in turn leads to reduced waste of radio resources.

According to a second aspect of the invention there is provided a control node for use in a mobile communications network, the control node being configured to operate in accordance with the previous method.

According to a third aspect of the invention there is provided a control node for use in a mobile communications network. The control node comprises a processor and a memory, the memory containing instructions executable by the processor, such that the control node is operable to: receive a request for authorization from a user equipment; determine whether the request for authorization includes evidence that the user equipment is authorized by a trusted traffic authority; and process the request for authorization only if the request for authorization includes evidence that the user equipment is authorized by the trusted traffic authority.

According to a fourth aspect of the invention there is provided a control node for use in a mobile communications network. The control node comprises: a receiving module for receiving a request for authorization from a user equipment; a determining module for determining whether the request for authorization includes evidence that the user equipment is authorized by a trusted traffic authority; and a processing module for processing the request for authorization only if the request for authorization includes evidence that the user equipment is authorized by the trusted traffic authority.

According to a fifth aspect of the invention there is provided a computer program configured, when run on a control node, to carry out the previous method. A sixth aspect relates to a computer program product comprising a computer readable storage medium and such a computer program stored on the computer readable storage medium.

According to a seventh aspect of the invention there is provided a method of operation of a user equipment in a mobile communications network. The method comprises: running an authorization or enrolment procedure with a trusted traffic authority; obtaining evidence that the user equipment is authorized by the trusted traffic authority; sending a request for authorization to a control node; and sending to the control node the evidence that the user equipment is authorized by the trusted traffic authority.

According to an eighth aspect of the invention there is provided a user equipment for use in a mobile communications network, the user equipment being configured to operate in accordance with the previous method.

According to a ninth aspect of the invention there is provided a user equipment for use in a mobile communications network. The user equipment comprises a processor and a memory. The memory contains instructions executable by the processor, such that the user equipment is operable to: run an authorization or enrolment procedure with a trusted traffic authority; obtain evidence that the user equipment is authorized by the trusted traffic authority; send a request for authorization to a control node; and send to the control node the evidence that the user equipment is authorized by the trusted traffic authority.

According to a tenth aspect of the invention there is provided a user equipment for use in a mobile communications network. The user equipment comprises: a performing module for an authorization or enrolment procedure with a trusted traffic authority; a receiving module for obtaining evidence that the user equipment is authorized by the trusted traffic authority; a sending module for sending a request for authorization to a control node, and for sending to the control node the evidence that the user equipment is authorized by the trusted traffic authority.

According to an eleventh aspect of the invention there is provided a computer program configured, when run on a user equipment, to carry out the previous method for the user equipment. A twelfth aspect relates to a computer program product comprising a computer readable storage medium and such a computer program stored on the computer readable storage medium.

According to a thirteenth aspect of the invention there is provided a method of operation of a trusted traffic authority device. The method comprises: receiving a request for authorization from a user equipment; determining whether the user equipment may be authorized; and, if it is determined that the user equipment may be authorized: sending to the user equipment evidence that the user equipment is authorized by the trusted traffic authority.

According to a fourteenth aspect of the invention there is provided a trusted traffic authority device, being configured to operate in accordance with the previous method.

According to a fifteenth aspect of the invention there is provided a trusted traffic authority device, comprising a processor and a memory. The memory contains instructions executable by the processor, such that the trusted traffic authority is operable to: receive a request for authorization from a user equipment; determine whether the user equipment may be authorized; and, if it is determined that the user equipment may be authorized: send to the user equipment evidence that the user equipment is authorized by the trusted traffic authority.

According to a sixteenth aspect of the invention there is provided a trusted traffic authority device, comprising: a receiving module for receiving a request for authorization from a user equipment; a determining module for determining whether the user equipment may be authorized; and, a sending module for, if it is determined that the user equipment may be authorized, sending to the user equipment evidence that the user equipment is authorized by the trusted traffic authority.

According to a seventeenth aspect of the invention there is provided a computer program configured, when run on a trusted traffic authority device, to carry out the previous method. An eighteenth aspect relates to a computer program product comprising a computer readable storage medium and such a computer program stored on the computer readable storage medium.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable storage medium in the form of a memory, such as solid-state memory, magnetic disk, or optical disk containing an appropriate set of computer instructions that would cause a processor/computer to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "user equipment device", "UE device", "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, LTE Advanced, New radio (NR) or any future standardized telecommunications network etc. As is also evident from the description below, the UE may thus be an embedded telematics unit in a vehicle, such as a car, truck, ship, or flying vessel, such as an airplane and a drone. The UE may even be the vehicle itself, as long as it is capable of communicating with at least one of the above exemplified communication networks.

Figure 1:
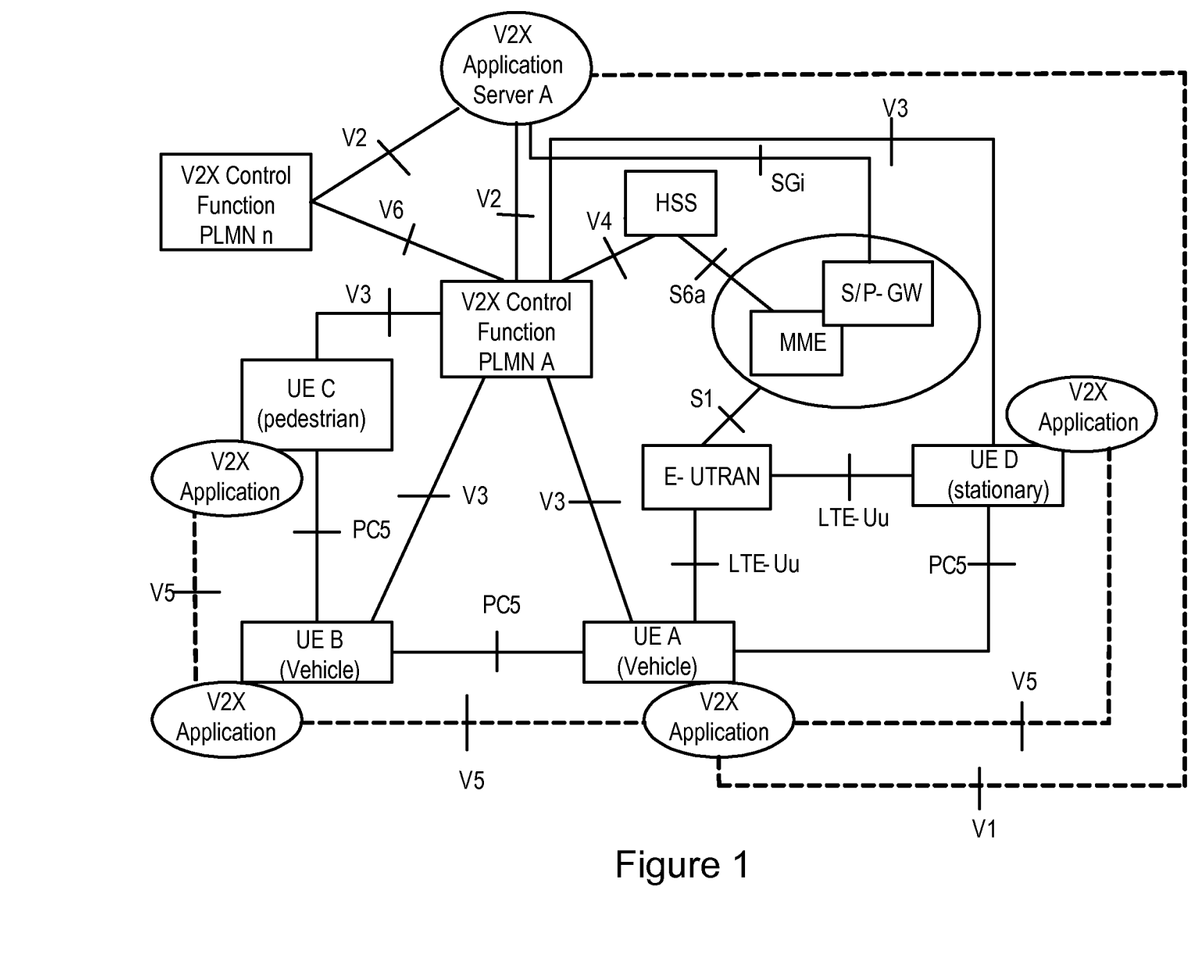
FIG. 1 illustrates a part of a cellular communications network.

FIG. 1 illustrates a part of a mobile communications network 10 for enabling vehicular communication.

More specifically, FIG. 1 illustrates a part of a communications network architecture allowing a telecom network to operate LTE based V2X systems in line with the requirements defined in TS 22.185 V14.1.0. V2X stands for "vehicle-to-anything" and that includes vehicle-to-vehicle (V2V), vehicle-to-pedestrian (V2P), vehicle-to-infrastructure (V2I) and vehicle-to-network (V2N).

There are two types of application making use of vehicular communication: safety related and non-safety related. For the safety related applications, the type and format of the messages is being defined by organizations and regulators dealing with transportation and safety. The communication model for many of the safety related application is broadcast-based such as Decentralized Environmental Notifications (DEN). DEN messages could be used to indicate that a hazardous situation is imminent (e.g. when a vehicle has lost control).

FIG. 1 illustrates the V2X architectural reference model adopted in 3GPP TS 23.785 v0.4.0. This is based on the model adopted for Proximity Services (ProSe) specified in 3GPP TS 23.303. It is assumed that both the existing LTE-Uu and the new V5 (enhanced PC5) reference points can be used for V2X broadcast communication. The LTE-Uu provides indirect communication through the network using Multimedia Broadcast Multicast Service (MBMS). The V5 provides direct communication over the side link channels.

The security solution for V2X communication may be based on public key cryptography. One example of a suitable Public Key Infrastructure (PKI) architecture is described in the US Department of Transportation (DOT) report number HS 812 014 on V2V communication, which describes a suitable Security Credential Management System (SCMS).

Figure 2:
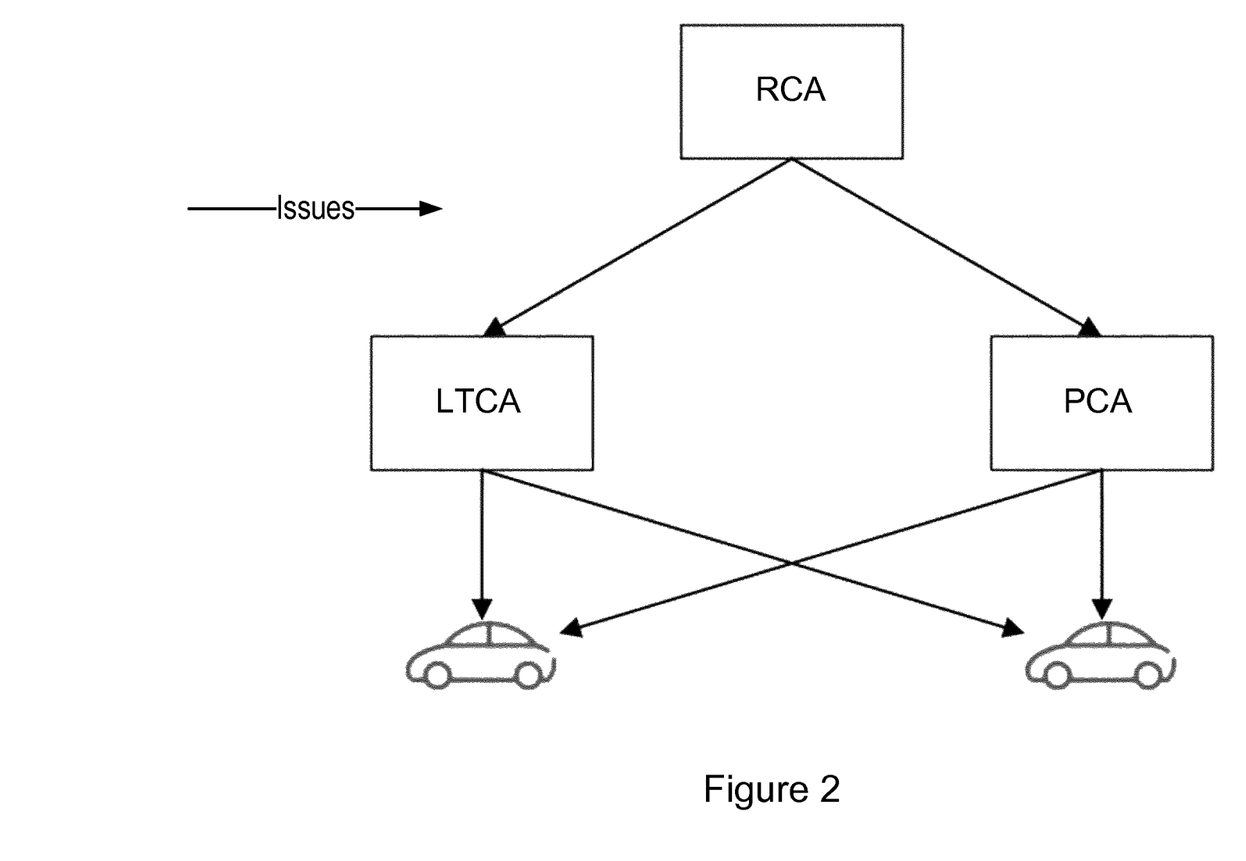
FIG. 2 illustrates a further part of a communications system.

FIG. 2 shows a high level view of the architecture of a suitable system, containing different types of Certificate Authorities (CA); namely Root CAs (RCA), Long Term CAs (LTCA) and Pseudonym CAs (PCA). An RCA could for example be a national transport administration. A UE enabled for V2X communication (referred to here as a V-UE) is provisioned with long term credentials by LTCAs. An LTCA could for example be a vehicle manufacturer. In order to preserve the privacy of a V-UE, a PCA then regularly provisions the V-UE with fresh short term pseudonym certificates. A PCA could for example be a local traffic authority, a third party operating and maintaining the infrastructure, etc. The short term pseudonym certificates are used to protect the V2X broadcast messages, thus protecting the system from misuse by unauthorized or malfunctioning V-UEs and at the same time protecting the privacy of end users (that is the drivers of the vehicles).

With a long-term certificate, a V-UE has the means to establish a secure channel with any relevant CA. For getting short-term pseudonym certificates, a V-UE sends a request, signed with the long-term certificate, to the relevant PCA without disclosing the long-term identifier. The long-term identifier of the V-UE is encrypted with the certificate of a LTCA. The PCA receiving the request asks the relevant LTCA to verify the long-term identifier of the V-UE. This guarantees that a V-UE can neither be tracked by the LTCA alone, nor can it be identified by the PCA alone.

Moreover, there will also be a central trusted entity possibly per country, or region in a country, or multiple countries, etc. handling the enrolment and authorization for the V2X communication (ETSI TS 102731). Such an entity is hereinafter referred to as Trusted Traffic Authority (TTA). A V-UE may for example establish a secure channel to the TTA using the long-term certificate. The TTA is independent from the MNO and therefore is typically not collocated either with a V2X Control Function or with a V2X Application Server of the Mobile Network Operator (MNO). The authorization from the TTA may need to be renewed on a regular basis, and there might be several reasons why a V-UE could become unauthorized, for example if the vehicle did not pass certain safety tests during the last check, or if the vehicle is no longer insured, etc.

However, if the MNO network does not know the status of the V-UE authorization in the TTA domain, the MNO network is vulnerable to misuse by V-UEs which are not authorized by the TTA. Even if this misuse is prevented, there is a waste of MNO radio resources if they are allocated to V-UEs that have not been authorized by the TTA in the first place.

Figure 3:
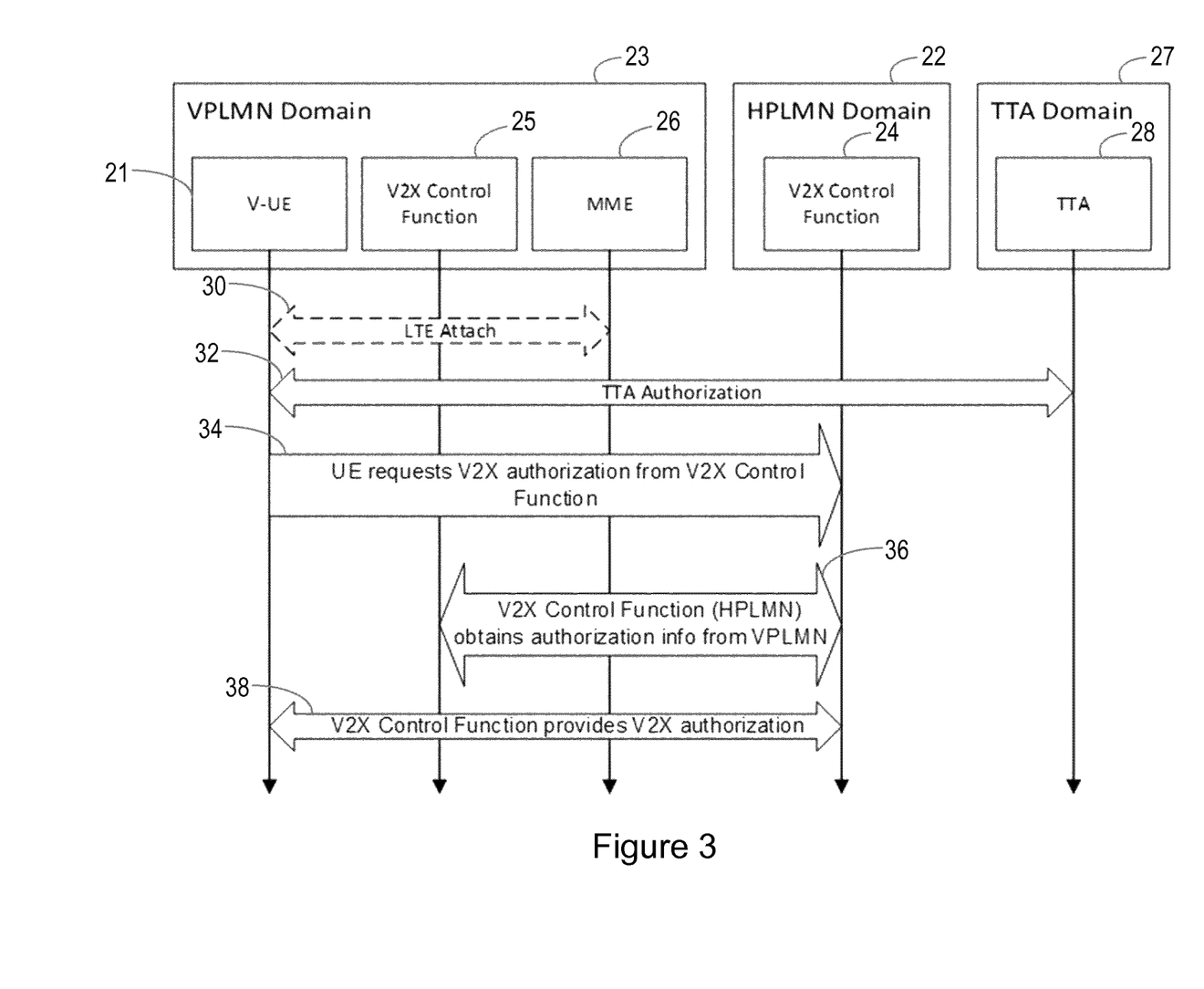
FIG. 3 is a signalling diagram illustrating a method.

FIG. 3 illustrates a process according to one embodiment provided by way of example.

In this example, a V-UE runs an authorization or enrolment procedure with a TTA using a long-term certificate. Upon successful authorization, the V-UE is provided with evidence of authorization by the TTA. The V-UE presents the evidence to a V2X Control Function for a V2X service authorization. In order to preserve privacy, the provided evidence is such that it neither reveals information on the actual MNO subscription used in the TTA domain, nor information of the long term credentials used towards the TTA in the MNO domain.

This allows the MNO to become aware of the authorization status of a V-UE in the TTA domain. The MNO knowing the status of the V-UE authorization in the TTA domain may have one or more advantages. As one example, it may protect the MNO's network from misuse by V-UEs which are not authorized by the TTA. This, in turn, helps the MNO network save resources by not allocating them to V-UEs, unauthorized in the TTA domain, in the first place. As another example, by making the TTA evidence unique per V-UE, the MNO subscription of a V-UE may be bound indirectly to the long-term certificate of the V-UE used in the TTA domain. This, in turn, helps achieve accountability on the V-UE.

This process involves steps taken in the Public Land Mobile Network (PLMN) Domain, that is, in this example, in an LTE network of the Mobile Network Operator (MNO). In this example, a UE enabled for V2X communication (V-UE) 21 with a Home Public Land Mobile Network (HPLMN) 22 is located in a Visited Public Land Mobile Network (VPLMN) 23. The Home Public Land Mobile Network (HPLMN) 22 and the Visited Public Land Mobile Network (VPLMN) 23 have respective V2X control functions 24, 25, and FIG. 3 also shows the LTE Mobility Management Entity 26 of the VPLMN 23.

The process also involves steps taken involving the Trusted Traffic Authority (TTA) domain 27, which includes a TTA authorization function 28.

The procedure for V2X service authorization relies solely on subscription information and is fully under the control of the V2X Control Function. The authorization status of a V-UE in the MNO domain is not related to the one in the TTA domain. To preserve privacy of the V-UE, the long-term certificates or identifiers used for authorization towards the TTA are not shared with the MNO.

As shown at step 30, the V-UE attaches to the LTE network and acquires a Packet Data Network (PDN) connection. It will be appreciated that any suitable connection may be used by the V-UE, and it is not necessary that this should be through the network of the MNO. For example, the V-UE may be able to perform a non-3GPP access, for example establishing a WiFi connection.

At step 32, the V-UE establishes a secure channel to the relevant TTA 27 and runs an authorization or enrolment procedure. Any suitable authorization or enrolment procedure defined by the TTA may be used.

Upon a successful authorization, the TTA authorization function 28 provides the V-UE with evidence of the authorization, for example in a form of an access token. The TTA authorization function may also provide the V-UE with a guarantee of the authenticity and/or integrity of the evidence. For example, the evidence may be signed by the trusted traffic authority.

In addition, the TTA authorization function 28 may provide the V-UE with evidence of freshness of the evidence of the authorization, in order to prevent the V-UE from later re-using evidence that is no longer valid. For example, the evidence of freshness may comprise a timestamp and/or a counter value.

The evidence of the authorization may also be provided with a validity time, such that the evidence may no longer be used when the expiry time has expired.

At step 34, the V-UE sends a request for V2X service authorization and this is handled by the V2X Control Function 24 in the HPLMN 22. As part of this process, the V-UE 21 provides the V2X Control Function 24 with the evidence from the TTA, that the UE is authorized by the TTA. The evidence from the TTA that the UE is authorized by the TTA may for example be provided in the request that initiates the process of service authorization, or may be provided during the process of service authorization in response to a request from the V2X Control Function 24.

On receipt of the request for V2X service authorization from the V-UE 21, the V2X Control Function 24 may determine whether that request includes, or is accompanied by, valid evidence that the UE is authorized by a TTA. If there is no such valid evidence, the V2X Control Function 24 may refuse the request and may for example send a reject message to the UE.

The determination, as to whether the request includes, or is accompanied by, valid evidence, may comprise checking a received guarantee of the authenticity and/or integrity of the evidence (for example, checking a signature of the trusted traffic authority); and/or checking evidence of freshness of the evidence (for example checking a timestamp and/or a counter value); and/or, if the evidence of the authorization is provided with a validity time, checking that expiry time has not expired.

If the request includes, or is accompanied by, valid evidence that the UE is authorized by a TTA, the process may continue. In that case, at step 36, the V2X Control Function 24 in the HPLMN 22 obtains authorization information from the V2X Control Function 25 in the VPLMN 23.

At step 38, the V2X Control Function 24 in the HPLMN 22 provides V2X service authorization to the V-UE. The authorization information provided to the V-UE applies to the serving PLMN/VPLMN 23. In other words, the UE gets authorization to use V2X communications on a per PLMN basis in the serving PLMN by the V2X Control Function 24 in the HPLMN. The V2X Control Function 24 in the HPLMN may thus previously also have requested authorization information from the V2X Control Function 25 in the VPLMN and merged authorization information from the HPLMN and the VPLMN before providing the authorization information to the V-UE 21. The UE stores the authorization information obtained from this V2X Control Function in a secure way.

Thus, the process may for example be as defined in 3GPP TR 23.785 v0.4.0, which in turn is based on the service authorization for proximity services specified in the 3GPP TS 23.303, with the addition that the evidence from the TTA, that the UE is authorized by the TTA, is presented to the V2X Control Function in the HPLMN.

If the TTA revokes its authorization of the V-UE, then, in order to propagate information about the revocation from the TTA domain to the MNO domain, additional communication is required between the TTA domain and the V2X Control function. Alternatively, the need for such additional communication may be avoided if the TTA provides the V-UE with evidence that has an expiry time, thus requiring the V-UE to renew the evidence on a regular basis. In order to guarantee authenticity of the evidence, the evidence may be signed by the TTA, and the V2X Control Function 24 may check for the presence of a valid signature as part of its check that the request includes, or is accompanied by, valid evidence that the UE is authorized by a TTA. In addition, or alternatively, the evidence could be protected against replay attack by including a timestamp to indicate when it was generated.

In some examples, it could be required that the evidence is unique per V-UE, so that the TTA can use it to identify V-UEs. As a result, the evidence binds the V-UE to a specific long-term certificate in the TTA domain and to a specific subscription in the MNO domain. For example, this can be used by the MNO to report V-UEs sending malformed messages to the TTA and can also be used by the TTA to notify the MNO in case a particular V-UE is no longer authorized.

Thus, a V-UE is first authorized at a relevant TTA, and obtains some evidence that can be used by a V2X Control Function during a service authorization procedure. This allows the MNO to become aware of the authorization status of a V-UE in the TTA domain.

Figure 4:
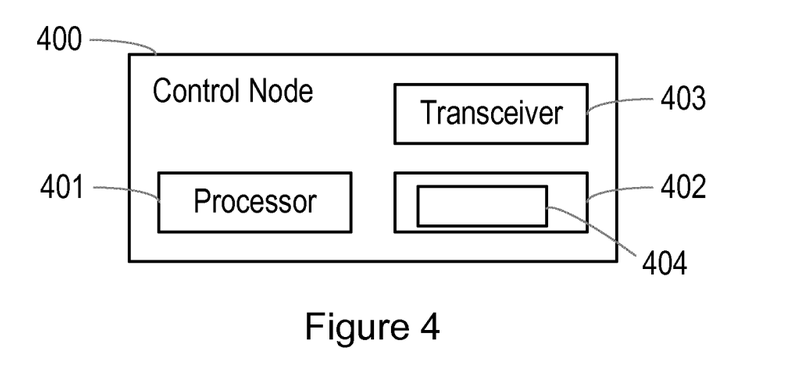
FIG. 4 illustrates a control node for use in a method.

FIG. 4 shows a V2X control function or control node 400 that can be adapted or configured to operate according to one or more of the non-limiting example embodiments described. The V2X control function or node 400 comprises a processor or processing unit 401 that controls the operation of the V2X control function or node 400. The processing unit 401 is connected to a transceiver unit 403 (which comprises a receiver and a transmitter) which is used to transmit signals to and receive signals from user equipment devices and other nodes in the network. The V2X control function or node 400 also comprises a computer program product 402 in the form of a memory or memory unit/ computer program storage medium that is connected to the processing unit 401 and that contains a computer program 404 which comprises instructions or computer code executable by the processing unit 401 and other information or data required for the operation of the V2X control function or node 400 in accordance with the methods described herein.

Figure 5:
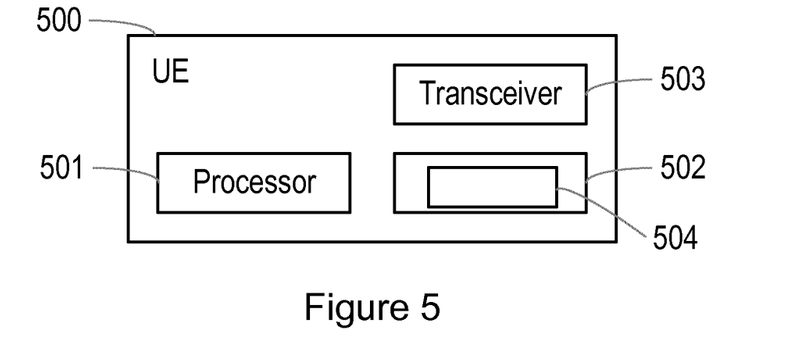
FIG. 5 illustrates a user equipment device for use in a method.

FIG. 5 shows a terminal device (UE) 500 that can be adapted or configured to operate according to one or more of the non-limiting example embodiments described. The UE 500 comprises a processor or processing unit 501 that controls the operation of the UE 500. The processing unit 501 is connected to a transceiver unit 503 (which comprises a receiver and a transmitter) with associated antenna(s) and is used to transmit signals to and receive signals from nodes in the network. The UE 500 also comprises a computer program product 502 in the form of a memory or memory unit/computer program storage medium that is connected to the processing unit 501 and that contains a computer program 504 which comprises instructions or computer code executable by the processing unit 501 and other information or data required for the operation of the UE 500 in accordance with the methods described herein. The terminal device is also referred to herein as a mobile station (MS) and a vehicle.

Figure 6:
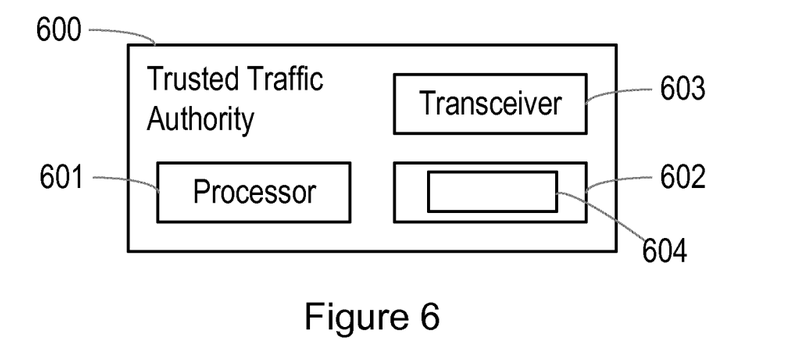
FIG. 6 illustrates a trusted traffic authority for use in a method.

FIG. 6 shows a trusted traffic authority control function or node 600 that can be adapted or configured to operate according to one or more of the non-limiting example embodiments described. The trusted traffic authority control function or node 600 comprises a processor or processing unit 601 that controls the operation of the trusted traffic authority control function or node 600. The processing unit 601 is connected to a transceiver unit 603 (which comprises a receiver and a transmitter) which is used to transmit signals to and receive signals from user equipment devices and other nodes in the network. The trusted traffic authority control function or node 600 also comprises a computer program product 602 in the form of a memory or memory unit/computer program storage medium that is connected to the processing unit 601 and that contains a computer program 604 which comprises instructions or computer code executable by the processing unit 601 and other information or data required for the operation of the trusted traffic authority control function or node 600 in accordance with the methods described herein.

Figure 7:
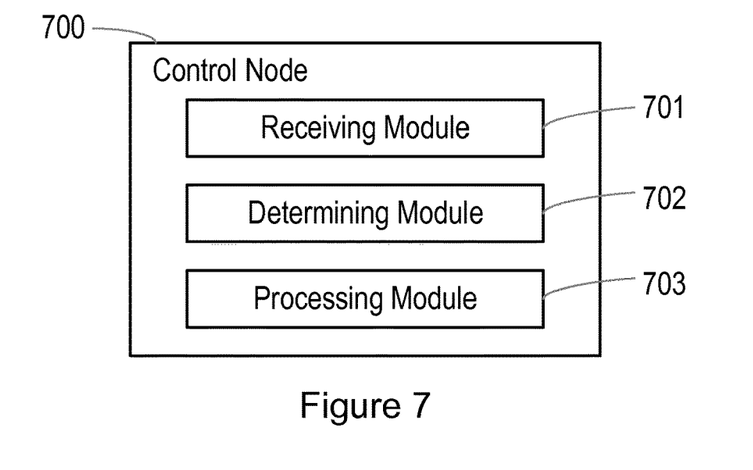
FIG. 7 illustrates a control node for use in a method.
Figure 8:
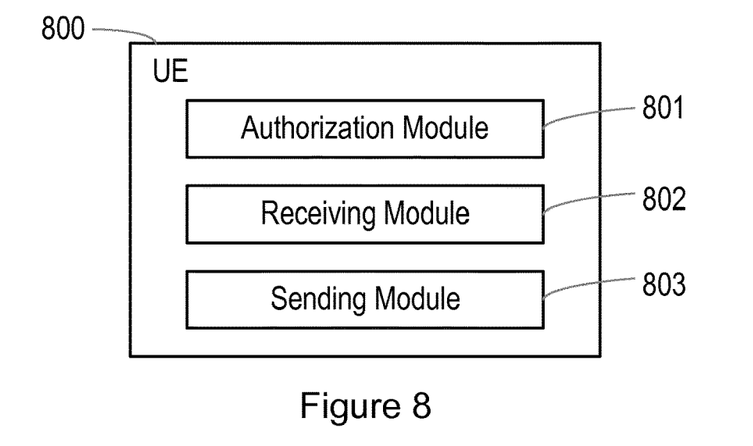
FIG. 8 illustrates a user equipment device for use in a method.
Figure 9:
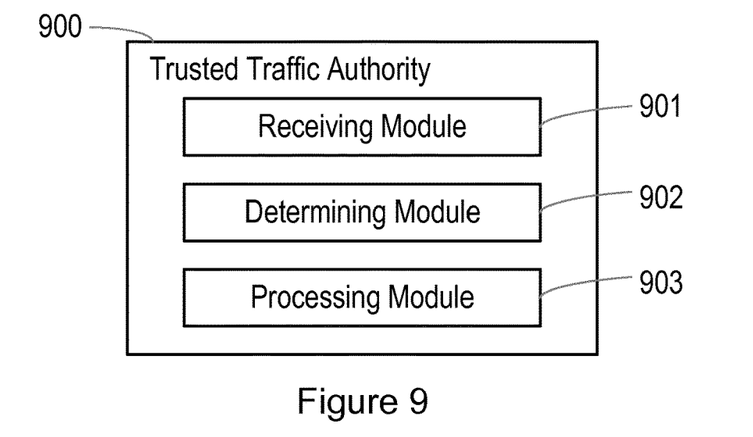
FIG. 9 illustrates a trusted traffic authority for use in a method.

FIGS. 7, 8 and 9 illustrate functional units in other embodiments of devices or nodes, which may execute any of the methods described herein, for example according to computer readable instructions received from a computer program. It will be understood that the modules illustrated in FIGS. 7, 8 and 9 are software implemented functional units, and may be realised in any appropriate combination of software modules.

Referring to FIG. 7 the control node 700 comprises a receiving module 701 for receiving a request for authorization from a user equipment device; a determining module 702 for determining whether the request for authorization includes evidence that the user equipment device is authorized by a trusted traffic authority; and a processing module 703 for processing the request for authorization only if the request for authorization includes evidence that the user equipment device is authorized by the trusted traffic authority.

Referring to FIG. 8 the user equipment device 800 comprises: an authorization module 801 for performing an authorization process with a trusted traffic authority; a receiving module 802 for receiving evidence that the user equipment device is authorized by the trusted traffic authority; and a sending module 803 for sending a request for authorization to a control node of the mobile communications network, and for sending to the control node the evidence that the user equipment device is authorized by the trusted traffic authority.

Referring to FIG. 9, the trusted traffic authority device 900 comprises: a receiving module 901 for receiving a request for authorization from a user equipment device; a determining module 902 for determining whether the user equipment device may be authorized; and a sending module 903 for, if it is determined that the user equipment device may be authorized, sending to the user equipment device evidence that the user equipment device is authorized by the trusted traffic authority.

Figure 10:
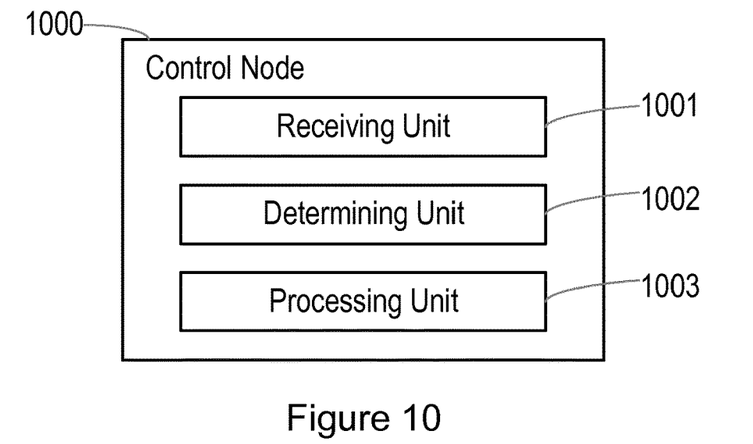
FIG. 10 illustrates a control node for use in a method.
Figure 11:
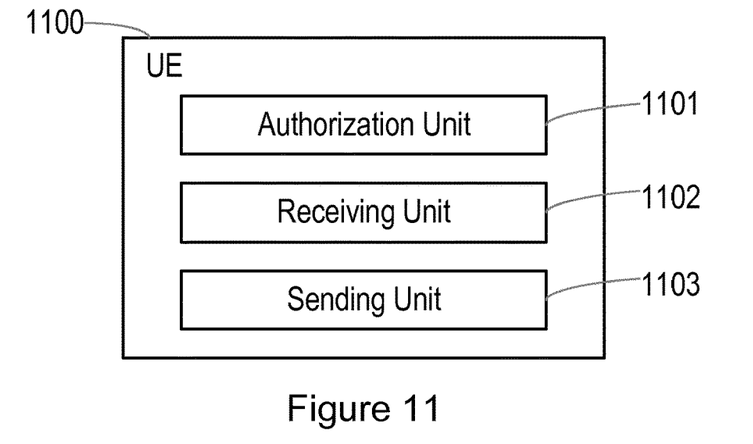
FIG. 11 illustrates a user equipment device for use in a method.
Figure 12:
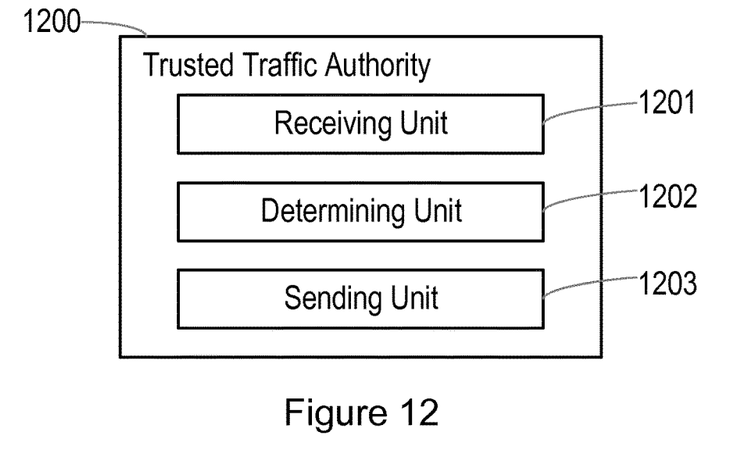
FIG. 12 illustrates a trusted traffic authority for use in a method.

FIGS. 10, 11 and 12 illustrate functional units in other embodiments of devices or nodes, which may execute any of the methods described herein. It will be understood that the units illustrated in FIGS. 10, 11 and 12 are hardware implemented functional units, and may be realised in any appropriate combination of hardware units.

Referring to FIG. 10 the control node 1000 comprises a receiving unit 1001 for receiving a request for authorization from a user equipment device; a determining unit 1002 for determining whether the request for authorization includes evidence that the user equipment device is authorized by a trusted traffic authority; and a processing unit 1003 for processing the request for authorization only if the request for authorization includes evidence that the user equipment device is authorized by the trusted traffic authority.

Referring to FIG. 11 the user equipment device 1100 comprises: an authorization unit 1101 for performing an authorization process with a trusted traffic authority; a receiving unit 1102 for receiving evidence that the user equipment device is authorized by the trusted traffic authority; and a sending unit 1103 for sending a request for authorization to a control node of the mobile communications network, and for sending to the control node the evidence that the user equipment device is authorized by the trusted traffic authority.

Referring to FIG. 12, the trusted traffic authority device 1200 comprises: a receiving unit 1201 for receiving a request for authorization from a user equipment device; a determining unit 1202 for determining whether the user equipment device may be authorized; and a sending unit 1203 for, if it is determined that the user equipment device may be authorized, sending to the user equipment device evidence that the user equipment device is authorized by the trusted traffic authority.

There are thus described methods of operation of control nodes and a user equipment device that allow for improved access control.

It should be noted that the above-mentioned embodiments illustrate rather than limit the invention, and that those skilled in the art will be able to design many alternative embodiments without departing from the scope of the appended embodiments. The word "comprising" does not exclude the presence of elements or steps other than those listed in an embodiment, "a" or "an" does not exclude a plurality, and a single feature or other unit may fulfil the functions of several units recited in the embodiments. Any reference signs in the embodiments shall not be construed so as to limit their scope.

The invention claimed is:

1. A method of operation of a Vehicle-to-Everything (V2X) control node in a mobile communications network, the method comprising:
   receiving a request for V2X authorization from a user equipment;
   determining whether the request for V2X authorization includes evidence that the user equipment is authorized by a trusted traffic authority, wherein the evidence is configured to not reveal information associated with:
      a Mobile Network Operator (MNO) subscription used in the trusted traffic authority; and
      credentials sent by the trusted traffic authority to the MNO; and
   processing the request for V2X authorization only if the request for V2X authorization includes evidence that the user equipment is authorized by the trusted traffic authority.

2. The method of claim 1, wherein the determining comprises determining whether the request for V2X authorization includes evidence whose authenticity is guaranteed.

3. The method of claim 2 further comprising determining whether the request for V2X authorization includes evidence signed by the trusted traffic authority.

4. The method of claim 1, wherein the determining comprises determining whether the evidence that the user equipment is authorized by a trusted traffic authority includes evidence of freshness.

5. The method of claim 4, wherein the evidence of freshness comprises a valid timestamp.

6. The method of claim 4, wherein the evidence of freshness comprises a counter value.

7. The method of claim 1, wherein the determining comprises determining whether the evidence that the user equipment is authorized by a trusted traffic authority is within a validity time thereof.

8. A Vehicle-to-Everything (V2X) control node for use in a mobile communications network, the control node comprising:
processing circuitry;
memory containing instructions executable by the processing circuitry whereby the V2X control node is operative to:
receive a request for V2X authorization from a user equipment;
determine whether the request for V2X authorization includes evidence that the user equipment is authorized by a trusted traffic authority, wherein the evidence is configured to not reveal information associated with:
a Mobile Network Operator (MNO) subscription used in the trusted traffic authority; and
credentials sent by the trusted traffic authority to the MNO; and
process the request for V2X authorization only if the request for V2X authorization includes evidence that the user equipment is authorized by the trusted traffic authority.

9. A method of operating a user equipment in a mobile communications network, the method comprising:
running a Vehicle-to-Everything (V2X) authorization or enrolment procedure with a trusted traffic authority;
obtaining evidence that the user equipment is authorized by the trusted traffic authority;
sending a request for V2X authorization to a V2X control node; and
sending, to the V2X control node, the evidence that the user equipment is authorized by the trusted traffic authority, wherein the evidence is configured to not reveal information associated with:
a Mobile Network Operator (MNO) subscription used in the trusted traffic authority; and
credentials sent by the trusted traffic authority to the MNO.

10. The method of claim 9, wherein the sending the evidence that the user equipment is authorized by the trusted traffic authority comprises sending the evidence that the user equipment is authorized by the trusted traffic authority as part of the request for V2X authorization.

11. The method of claim 9, wherein the running the V2X authorization or enrolment procedure comprises an establishment of a secure channel with the trusted traffic authority using a certificate.

12. A user equipment for use in a mobile communications network, the user equipment comprising:
processing circuitry;
memory containing instructions executable by the processing circuitry whereby the user equipment is operative to:
run a Vehicle-to-Everything (V2X) authorization or enrolment procedure with a trusted traffic authority;
obtain evidence that the user equipment is authorized by the trusted traffic authority;
send a request for V2X authorization to a V2X control node; and
send, to the V2X control node, the evidence that the user equipment is authorized by the trusted traffic authority, wherein the evidence is configured to not reveal information associated with:
a Mobile Network Operator (MNO) subscription used in the trusted traffic authority; and
credentials sent by the trusted traffic authority to the MNO.

13. A method of operation of a trusted traffic authority device, the method comprising:
receiving a request for Vehicle-to-Everything (V2X) authorization from a user equipment;
determining whether the user equipment may be authorized; and,
in response to determining that the user equipment may be authorized,
sending, to the user equipment, evidence that the user equipment is authorized by the trusted traffic authority, wherein the evidence is configured to not reveal information associated with:
a Mobile Network Operator (MNO) subscription used in the trusted traffic authority; and
credentials sent by the trusted traffic authority to the MNO.

14. The method of claim 13, further comprising including a guarantee of authenticity of the evidence that the user equipment is authorized by the trusted traffic authority.

15. The method of claim 14, further comprising signing the evidence that the user equipment is authorized by the trusted traffic authority.

16. The method of claim 13, further comprising adding evidence of freshness to the evidence that the user equipment is authorized by the trusted traffic authority.

17. The method of claim 16, wherein the evidence of freshness comprises a valid timestamp.

18. The method of claim 16, wherein the evidence of freshness comprises a counter value.

19. The method of claim 16, further comprising including a validity time to the evidence that the user equipment is authorized by the trusted traffic authority.

20. The method of claim 13, further comprising, in response to determining that the user equipment may be authorized, allowing the user equipment to take part in vehicular communications.

21. A trusted traffic authority device, comprising:
processing circuitry;
memory containing instructions executable by the processing circuitry whereby the trusted traffic authority device is operative to:
receive a request for Vehicle-to-Everything (V2X) authorization from a user equipment;
determine whether the user equipment may be authorized; and,
in response to determining that the user equipment may be authorized, send, to the user equipment, evidence that the user equipment is authorized by the trusted traffic authority, wherein the evidence is configured to not reveal information associated with:
a Mobile Network Operator (MNO) subscription used in the trusted traffic authority; and
credentials sent by the trusted traffic authority to the MNO.

\* \* \* \* \*